US011049046B2

(12) United States Patent
Balaji et al.

(10) Patent No.: US 11,049,046 B2
(45) Date of Patent: Jun. 29, 2021

(54) SOFTWARE APPLICATIONS AND METHODS FOR IMPLEMENTING APPLICATIONS TO AGGREGATE BUSINESS TRAVEL DATA ON MOBILE DEVICES

(71) Applicant: Obex Solutions, LLC, Houston, TX (US)

(72) Inventors: Sridhar Balaji, Houston, TX (US); Kevin Le, Houston, TX (US); Shekhar Tembhekar, Houston, TX (US)

(73) Assignee: OBEX SOLUTIONS, LLC, Houston, TX (US)

(*) Notice: Subject to any disclaimer, the term of this patent is extended or adjusted under 35 U.S.C. 154(b) by 625 days.

(21) Appl. No.: 15/682,345

(22) Filed: Aug. 21, 2017

(65) Prior Publication Data
US 2018/0114148 A1 Apr. 26, 2018

Related U.S. Application Data

(60) Provisional application No. 62/377,699, filed on Aug. 22, 2016.

(51) Int. Cl.
*G06Q 10/02* (2012.01)
*G06Q 50/14* (2012.01)
*G06Q 10/06* (2012.01)
*H04W 4/24* (2018.01)
*G06F 16/903* (2019.01)
*H04W 4/029* (2018.01)
*H04M 15/00* (2006.01)

(52) U.S. Cl.
CPC ........... *G06Q 10/02* (2013.01); *G06F 16/903* (2019.01); *G06Q 10/0631* (2013.01); *G06Q 50/14* (2013.01); *H04M 15/41* (2013.01); *H04M 15/44* (2013.01); *H04M 15/8033* (2013.01); *H04M 15/8038* (2013.01); *H04W 4/029* (2018.02); *H04W 4/24* (2013.01)

(58) Field of Classification Search
CPC .... G06Q 10/02; G06Q 10/0631; G06Q 50/14; G06F 16/903; H04W 4/029
USPC .......................................................... 705/5
See application file for complete search history.

(56) References Cited

U.S. PATENT DOCUMENTS

| 6,029,144 | A | * | 2/2000 | Barrett | .................... | G06Q 99/00 |
| | | | | | | 235/375 |
| 7,050,986 | B1 | * | 5/2006 | Vance | .................... | G06Q 10/02 |
| | | | | | | 705/5 |

(Continued)

FOREIGN PATENT DOCUMENTS

CN 104158845 * 7/2014 ............. G06Q 10/10

OTHER PUBLICATIONS

Baryer, Andy. CNET. "Smart ways to share your travel itinerary", https://www.cnet.com/how-to/smart-ways-to-share-your-travel-itinerary/ (Year: 2014).*

*Primary Examiner* — George Chen
*Assistant Examiner* — Lisa Ma
(74) *Attorney, Agent, or Firm* — Robert W Strozier

(57) ABSTRACT

Applications for servers, mobile, and non-mobile devices, methods for implementing applications thereon include business trip booking and aggregating trip data so that aggregated trip itinerary data by be created, modified, updated and stored for employee traveler and employer access using the applications and methods.

19 Claims, 6 Drawing Sheets

(56) References Cited

U.S. PATENT DOCUMENTS

| | | | |
|---|---|---|---|
| 7,685,253 B1* | 3/2010 | Valia | H04L 67/34 |
| | | | 709/217 |
| 2012/0330906 A1* | 12/2012 | Fredericks | G06F 16/29 |
| | | | 707/692 |
| 2013/0117057 A1* | 5/2013 | Van Moltke | G06Q 10/025 |
| | | | 705/7.13 |
| 2013/0162529 A1* | 6/2013 | Turk | G06Q 10/00 |
| | | | 345/157 |
| 2015/0324756 A1* | 11/2015 | Hughes | G06Q 10/1095 |
| | | | 705/7.19 |
| 2016/0203444 A1* | 7/2016 | Frank | G06F 3/0484 |
| | | | 705/7.19 |
| 2017/0046632 A1* | 2/2017 | Fabris | G06Q 10/02 |
| 2018/0197147 A1* | 7/2018 | Cigelnik | G06Q 10/1053 |
| 2019/0279317 A1* | 9/2019 | Burton | H04L 51/16 |

* cited by examiner

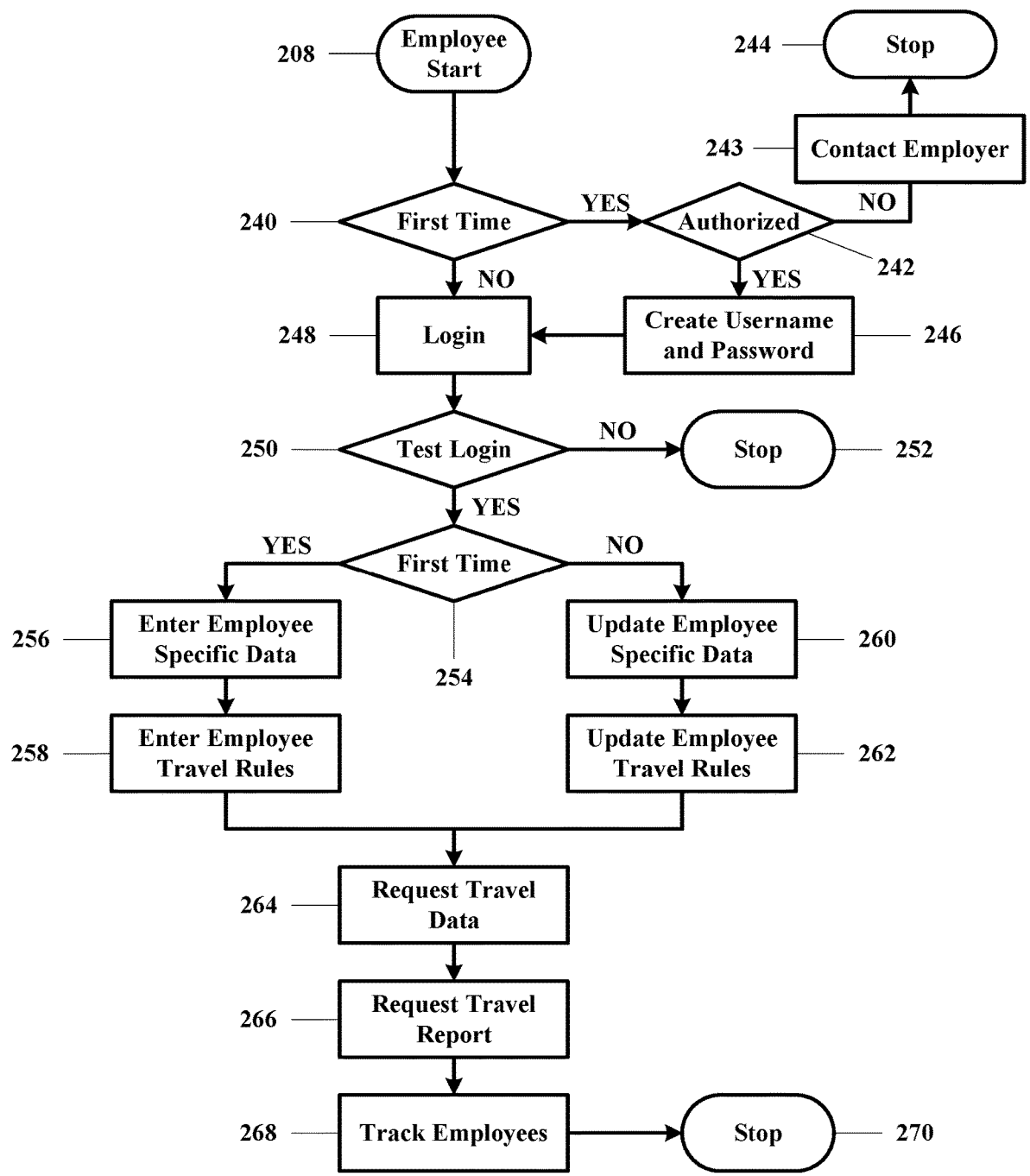
FIG. 2 - Cont'd.

SOFTWARE APPLICATIONS AND METHODS FOR IMPLEMENTING APPLICATIONS TO AGGREGATE BUSINESS TRAVEL DATA ON MOBILE DEVICES

RELATED APPLICATIONS

This application claims the benefit of and priority to U.S. Provisional Patent Application Ser. No. 62/377,699 filed Aug. 22, 2016 (22 Aug. 2016).

BACKGROUND OF THE INVENTION

1. Field of the Invention

Embodiments of the present disclosure relates to apparatuses including mobile devices, non-mobile devices, and/or distributed computer systems including software applications contained thereon to aggregate and coordinate travel related data, to software applications implemented on mobile devices, non-mobile devices, and/or distributed computer systems to aggregate and coordinate travel related data, and to methods for implementing applications to aggregate and coordinate travel data on mobile devices, non-mobile devices, and/or distributed computer systems.

More particularly, embodiments of the present disclosure relates to apparatuses including mobile devices, non-mobile devices, and/or distributed computer systems including software applications contained thereon to aggregate and coordinate travel related data, to software applications implemented on mobile devices, non-mobile devices, and/or distributed computer systems to aggregate and coordinate travel related data, and to methods for implementing applications to aggregate and coordinate travel data on mobile devices, non-mobile devices, and/or distributed computer systems, wherein the mobile devices including cell phones, tablets, notebook computers or similar mobile devices and wherein the non-mobile devices include desk top computers, servers, cloud servers, and other similar non-mobile devices and wherein the applications permit the cell phone user to aggregate and coordinate travel itinerary data, personal data, and travel billing data and to access to itinerary update data and itinerary augmentation data.

2. Description of the Related Art

Most corporations use a travel agency or travel management company (TMC) to manage all their business travel needs. Employees are often asked to travel to customer, potential sales, other offices, business meetings etc. by their Employers. In order to manage all aspects of their travel, the company (employer) will choose a travel service provider who will not only manage their trip related bookings, but also provide other travel related services for example provide travel spend reports, duty of care (whereabouts of the employee on a business trip), traveler support, obtaining trip insurance etc. This has been the norm for many decades before the advent of the internet.

Over 20 years ago, various internet based tools started offering consumers a way to book for their trips, necessarily avoiding the need to call a travel agent for help.

In order to counter the internet based offerings, a number of software vendors developed businesses self-booking tools that obviate the need for travelers to contact (email or phone) a human agent to create their bookings. These software based tools offer ways to capture the most important details much like what a human agent would do, to correlate a trip to travel spending such as cost center, location codes, etc. These tools automated bookings for the employee trips. Such tools have been in existence and used in the business travel community for the past 18 years.

While software tools and software applications have been developed to assist business travelers in arranging, booking, tracking and updating travel itinerary, there is a need in the art for a mobile device application that facilitates the aggregation of all aspects of business travel from booking, to tracking, to updating, to notifications, to billing, and to all other aspects associated with business travel.

SUMMARY OF THE INVENTION

Embodiments of the present disclosure provide apparatuses including mobile devices, non-mobile devices, and/or distributed computer systems including software applications contained thereon to aggregate and coordinate travel related data.

Embodiments of the present disclosure provide software applications for mobile devices and/or non-mobile devices, methods for implementing applications on the mobile devices and/or the non-mobile devices, and a distributed computer system implementing the methods, where the mobile devices including cell phones, tablets, notebook computers or similar mobile devices and the non-mobile devices include desk top computers, servers, cloud servers, and other similar non-mobile devices. The methods include enrolling a company on a host site, where the enrolling includes a list of employees that are authorized to travel for the company, a list of rules associated with employee travel, and data associated with billing and accounting associated with employee travel. Once installed, each authorized employee installs an application on one mobile device or a plurality of mobile devices and/or one non-mobile device or a plurality of non-mobile devices. The methods then request the employee to set up an account including user name and password as well as security question selection and responses. Once registered, the methods may search email and text messages for travel related data including air travel bookings, housing bookings, land transportation bookings, and/or any other travel relating bookings. The methods then query the employee about self-bookings and correlates the responses to the searched messages to insure that all relevant booking have been caught. The methods then forward the data to the host site, where the booking data from the messages is merged with all travel data resident on the host site obtained by polling housing sites, air travel sites, ground transportation sites, and/or other travel related sites and pulling the booking information for the employee from the sites and updating the employee travel itinerary. The methods also include applying company or employer specific travels rules to the travel data and either updating the bookings directly or forwarding updating data to the employee on the mobile device so that the employee updates the booking information. The methods also include aggregating all of the travel information and populating the application display data into reviewable screen images on the mobile device. The methods also include monitoring trip advisors, delays/cancellations, and/or other potential trip augmenting information. If the monitored information requires one change or a plurality of changes in the travel itinerary, then the methods searches housing sites, air travel sites, ground transportation sites, and/or other travel related sites and notifies the employee of potential modification and/or alternatives to the employee travel itinerary. The employee may then select from the modification and/or alternatives. Each modification and/or alternative selected is forwarded to the host site and the methods update the employee travel itinerary at the host site and on the mobile device. If billing and accounting information has not been associated with the employee travel itinerary, then the methods would query the employee for such information or provide the employee with a list of employer/employee authorized billing and/or accounting selection. The methods would then update the itinerary on both the host site and the mobile device providing the employee with an aggregated itinerary from which all employee and employer are capable of knowing all aspects of the employee travel. The methods may also include tracking the employee's mobile devices via one or more global positioning system (GPS) applications running on the devices and updating the itinerary with GPS data and well as other relevant data for tracking and/or notifying the employee of potential difficulties and/or travel warnings. The methods may also include generating billing and accounting reports sent to the employee and to the employer for accounting and reimbursement purposes. The methods may also involve analyzing the itinerary data for each employee and modifying the travel rules to incorporate employee preferences from authorized housing, ground transportation, air travel, and/or other travel service providers so that application of the travel rules may accommodate employee preferences with possible.

Embodiments of the present disclosure provide software applications installed on mobile devices that implement the methods of this disclosure allowing an aggregated employee travel itinerary to be collected, modified, augments, and displayed on a smart mobile device, with the itinerary also being stored on a host site. The application permits employees and employers to establish employee travel itinerary that is complete or substantially complete both for the employee and the employer and permits the travel itinerary to be modified, augmented and updated based on employee and/or employer input and through the application of employer travel rules to the itinerary at the host site, at the employee mobile device or a combination thereof and permits storage of itinerary data so that the application is capable of modifying the rules based on employee preferences and the applicable of modifying the itinerary based on changes due to cancellations, delays, additions, or any other reason requiring a change the itinerary.

BRIEF DESCRIPTION OF THE DRAWINGS

The disclosure can be better understood with reference to the following detailed description together with the appended illustrative drawings in which like elements are numbered the same.

DETAILED DESCRIPTION OF THE INVENTION

Figure 1:
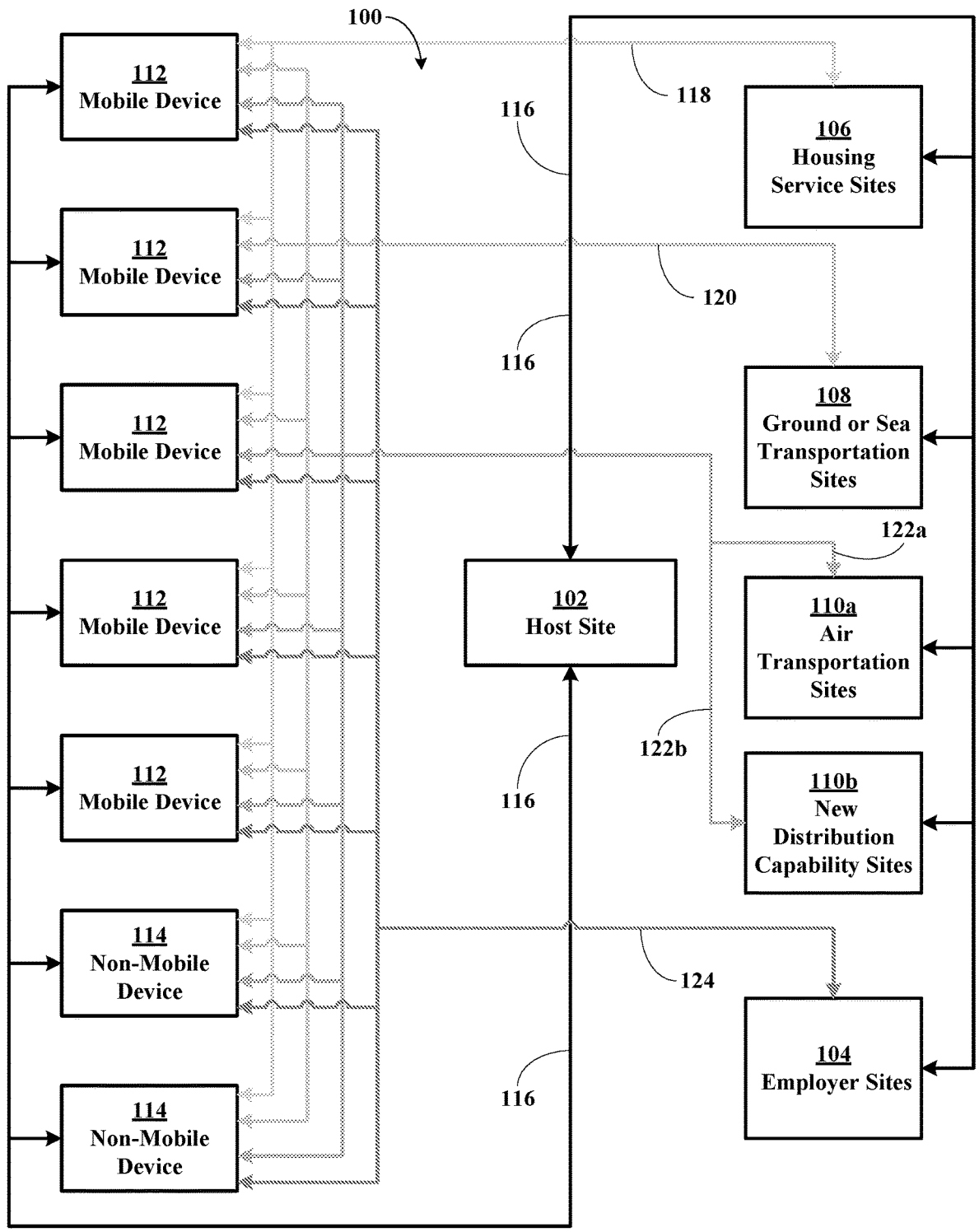
FIG. 1 depicts an embodiment of a system of this disclosure.

The inventors have found that smart mobile device applications may be constructed and implemented on smart mobile devices, non-mobile devices, and a host site, where the applications, once installed and activated gather employee travel itinerary data including booking data, personal data, accounting and billing data, and other travel related data in an aggregated format for quick and efficient displaying, monitoring, stored, updating, and/or changing from the devices and the host site. The applications also include steps implemented on the devices and the host site for polling data from the devices and remote booking sites to construct a travel itinerary. The application then applies employer rules or employer rules and personal rules to the itinerary data to create an augmented itinerary and notifies booking sites of the augmented itinerary. The application also queries the employee about billing and/or accounting information or the application applies billing and accounting data stored at the host site to form an aggregated itinerary including booking data, billing and accounting data, and other relevant travel related data. The employer rules include employer approved air transportation providers, employer approved ground transportation providers, approved housing providers, and employer approved other travel related provides, while personal rules include personal air transportation data including mileage program user names and passwords, seat preferences, upgrade preferences, or other similar air transportation preferences, personal ground transportation data including reward program user name and password, vehicle preferences and upgrade preferences, personal housing data including reward program user name and password, room preferences, and upgrade preferences. The application may attain the personal data either from user input at the time of installation of the application, from data stored in the host site associated with the user, or from data learned based on previous travel data for the user. The application implemented at the host site and/or the devices permits data analytics to be performed so that the employer and/or employee can request the generation of reports evidencing billing and accounting information for a specific trip or multiple trips or tracking of travel per employee for improved work and travel employee distribution. The application also include procedures for checking travel related cancellation, delays, advisories, and/or other data that would adversely affect a given itinerary and automatically augmenting and/or changing itinerary to address the disruptions and/or to notify the employee of such disruptions and allowing the employee options for augmenting and/or changing the travel itinerary.

Embodiments of the present disclosure are directed to applications designed to run on mobile and non-mobile devices including a processing unit, communication hardware and software, and a human cognizable output device such as a display devices, an audio devices or an audiovisual devices, which may be integrated into the mobile or non-mobile device. The application is designed to be installed on the devices. Once installed, the application with communication to a host server is capable of display travel itinerary data for business travelers, where the data include all relevant data associated with business travel all aggregated into a single data structure displayable, editable, and updateable on the mobile device and/or on the host device with host updates forwarded or pushed to the mobile devices. In this way, the business travel has a one stop source for all itinerary data without invoking any other application.

With the advent of the internet and wireless communication networks such as cell networks, satellite networks or other wireless network communication formats, employees have the ability to book all or part of a business trip using online services such as EXPEDIA®, a registered trademark of Expedia, Inc., KAYAK, a trade name of The Priceline Group, TRAVELOCITY®, a registered trademark of Travelscape LLC, TRAVEFY, a trade name of Travefy, Inc., AAA, etc. or to book all or part of a business trip directly using direct connect services available from air transportation service providers including all private and public international and national carriers, ground transportation service providers including all private and public international and national service providers, or housing service providers including all private and public international and national hotel and motel providers and housing placement providers. The availability of so many options to book travel for the employees has caused real travel management problems for companies, employers, that want to manage travel expenditures, liabilities, and/or optimize employee travel. Convenience also plays a major role in employee business travel planning and booking as these online booking services often provide improved interfaces and self-service options, especially using mobile devices.

Today, for example, it is quite common for travelers to request air transportation bookings from a travel agency or a travel management company (TMC), and then to use a housing service provider site to book housing accommodations. Additionally, many new housing and ground transportation options are available such as AIRBNB (for lodging) or UBER (for ground transportation). All these options give rise to a growing trend in the industry called "Open Booking" or "Un-Managed Travel". This type of business travel booking may leave gaps in employee and/or employer expense data collection, billing, and reconciliation, gaps in employee travel planning and travel planning optimization, and gaps in tracking employees during business travel.

Business Traveler

An employee business traveler has a number of unique requirements that are never required when a person is on a vacation or leisure trip. These requirements may be summarized in employee profiles created by the employee and/or employee at the employer place of business and stored in or on employer site in one or more employer servers accessible over wired or wireless networks. An example of an employee profile is shown in Table I.

TABLE I

| Employee Attribute Profile |
|---|
| Employee Name |
| Business Email |
| Personal Email |
| Business Phone Number |
| Cellular Number |
| Department |
| Cost Center Code |
| Billing Account Code |
| Location |
| Manager |
| Status |

The above example of an employee attribute profile is usually held within the employer's business systems (e.g., human resource department). The profiles generally remain as part of an employee database and are updated to match internal organization, billing information, reporting information, employee status, etc. The database may also include personal employee travel data including reward user names/passwords, air transportation preferences, ground transportation preferences, housing preferences, etc. The database may also include employer travel preference data including approved and/or preferred air transportation providers, approved and/or preferred ground transportation providers, approved and/or preferred housing providers, etc. When a trip booking is made with the help of a TMC, these data attributes are collected and indicated within trip booking format (often called PNR->Passenger Name Record).

Trip Specific Profile Data

Along with the employee attribute profile, the employee is often sometimes asked to provide some trip specific information each time the employee go on a business trip at the time of booking. These data are also collected and indicated within the PNR. These data are input by the agent or prompted for entry by the employee from the application (in the case of self-booking tools) when booking and purchasing a trip bookings. An example of a trip specific profile is set forth in Table II.

TABLE II

| Trip Attribute Profile |
|---|
| Reason Code(s) |
| Client Number |
| Approval Code |

Both these data groups are required for accurately cataloging, billing, and tracking of employee travel, the employee travel expenditures, etc. and to properly provide a unified travel management experience. At the end of the data collection process, a "Passenger Record" will be created and presented on the employee mobile device, at the employer site, and/or at the application host site. An example of a Passenger Record is set forth in Table III.

TABLE III

| Passenger Record |
|---|
| Name |
| Email |
| Gender |
| DOB |
| Phone Number |
| Department |
| Cost Center Code |
| Location |
| Manager |
| Trip Reason Code(s) |
| Client Number |
| Approval Code |
| Bookings (Air, Hotel, Car, etc.) |
| Departure Location |
| Arrival location |
| Date and Time |
| Address |
| Confirmation # |

While bookings made by an TMC offer a way to create a data record like the one set forth above. The same is not true when bookings are made on other channels by an employee. Allowing trip aggregation of trip itinerary data from all channels is a necessary first step.

Business Travel Models

Table IV tabulates various business travel formats that currently exist in the marketplace.

TABLE IV

| Business Travel Formats | |
|---|---|
| Fully Managed Business Travel | TMC managed - No Online Self-booking Tools and No Open Booking |
| Fully Managed Business Travel | TMC Managed and Self-Booking Tools - No Open Booking |

TABLE IV-continued

Business Travel Formats

| | |
|---|---|
| Partially Managed Business Travel | Open Booking and TMC Managed Booking |
| Unmanaged Business Travel | Open Booking - No TMC Managed Booking |

While the inventors have listed the current formats by which business travel is booked, the present disclosure is not limited to these formats, but may be configured to gather relevant travel itinerary data from any source regardless of the system containing the data. The applications of this disclosure permit the business traveler to review, modify, alter and/or change itinerary data on his/her mobile devices or non-mobile devices, by simply launching the applications on the devices, logging in. The applications will then display all itinerary data so that the business traveler, a travel agent or an employer may review, update, modify, and/or alter the itinerary. Again, the applications of this disclosure are designed to permit the aggregation of any relevant business travel itinerary data from any source for employers and employees registered on the applications. In the above table, the unmanaged business travel situation is often the most challenging for tracking, aggregation, and report generation. The present methods are ideally suited for handling business travel involving any amount of unmanaged business travel easily and efficiently. The methods are designed to pull all of relevant the unmanaged booking information into the mobile device and onto the appropriate server sites for tracking, aggregation, and report generation and feedback back to the mobile device. The methods also allow the user to correct, augment, supplement, and/or add content to identify charging centers, reasons for trip, relevant meeting information, etc., where all supplementation is pushed out the servers for tracking, aggregation, and report generation upon request by the employer, employer authorized personnel or the user, all in real-time.

Online Travel Booking sites including, without limitation, EXPEDIA®, KAYAK, HOTELS.COM, PRICELINE®, or any other online booking service.

Air transportation provider sites including, without limitation, United.com, AA.com, Delta.com, or any other international or domestic air transportation providers, both public and private.

Housing provider sites including, without limitation, hotel and motel sites such as Marriott.com, IHG.com, Hyatt.com, Hilton.com, or any other international or domestic hotel/motel provider.

Ground transportation provide sites including, without limitation, rental car provider sites such as Hertz.com, Avis.com, Thrifty.com, Alamo.com, Budget.com, or any other international or domestic ground transportation provider Other online providers including, without limitation, AIRBNB, UBER, LYFT, or any other online provider of transportation services or housing services.

The inventors have designed the applications and methods of this disclosure to address the difficulties presented by unmanaged travel or open booking formats. Aspects of the applications and methods of this disclosure are designed to collect and aggregate itinerary data so that the host site, the traveling employee and/or the employer may view, modify, and update itinerary data improving employee travel and travel flexibility, improving travel billing and accounting, improving employee tracking, improving ease of modifying and updating travel itinerary and improving data analytics. The applications and methods of this disclosure are designed to capture all relevant itinerary data from commercial booking sites. This aspect of the applications and methods utilized software services provided by a third party such as Award Wallet or similar third party services. These software services are used programmatically within the code implementing the applications and methods of this disclosure. The applications and methods of this disclosure are also designed to capture bookings made via a TMC agent. The TMC agents traditionally use a system known as Global Distribution System (GDS) software such as SABRE, TRAVELPORT, AMADEUS, WORLD SPAN, etc. These software services are used programmatically within the code implementing the applications and methods of this disclosure and provide a programmatic avenue to capture itinerary data from various air transportation sites. The applications and methods of this disclosure are also designed to capture bookings made via self-booking tools such as CONCUR, DEEM, GETTHERE, NUTRAVEL, etc. These tools connect up to the GDS systems so that itinerary data may be captures allowing the applications and methods of this disclosure to capture the self-bookings made by employee seamlessly without employee or employer input. The applications and methods of this disclosure are also designed to make the process of aggregating and organizing the itinerary data made via any of the above three methods into a single business trip itinerary interface so that the employee, employer, and/or host site personnel can view the complete itinerary for any trip. The applications and methods of this disclosure are also designed to invoke data rules (e.g., rules to report on travel expenditures, rules to notify sites of reward codes, rules to notify sites of employer discounts, rules to notify sites of employee discounts, etc.) modifying, updating, and/or augmenting the itinerary data seamlessly so that itinerary data is properly aggregated and includes all relevant itinerary data. This type of aggregated itinerary data is sometimes called User Defined Interface Data (UDID) in the Business travel industry. The applications and methods of this disclosure are also designed to track air transportation and ground transportation delays, cancellations, or other disruptions and notify the employee and the host site and optionally the employer of such disruptions. The applications and methods of this disclosure are also designed to automatically alter the itinerary based on employee and/or employer rules and preferences and/or to provide the employee with a list of options from which to select and update the itinerary data. The applications and methods of this disclosure are also designed to track employee travel so that host site personnel and/or the employer is capable of notifying employees concerning updates and alterations in scheduling and meeting and to better coordinate employee travel to maximize fund utilization. The applications and methods of this disclosure are also designed to allow employees access to the tracking data so that they may be able to coordinate travel to meet with other employees for data exchange and/or to improve comradery.

There are a number of tools that in the art designed to aggregate or capture booking data from websites and employ similar of varied methods. This include tools such as TRAXO, WORLDMATE and Concur's TRIPLINK. These tools offer software that can allow these trip data to be captured. However, these tools have certain deficiencies. These tools do not correlate booking data and augment it with traveler specific data such as found in employees HR records (department, budget codes, locations, etc.) and/or trip specific profile data such as when a single trip pertains to a specific trip reason requirement (customer, project, etc.). These tools do not aggregate that trip information of bookings made via a TMC service. For example, if a traveler books an air booking via a TMC agent or a self-booking tool and then books a hotel via a web based service such as EXPEDIA, TRAXO, TRIPLINK, etc. will only capture and show the hotel booking. While each of these tools offer a way to programmatically push the air booking, there is still that data gap as indicated above.

The deficiencies may be detailed in the following example to illustrate what is currently available and the gaps that exist in data aggregation using these tools. First, a traveler books air transportation via a TMC agent. The TMC agent will generate/capture: (a) booking specific data including departure city, arrival city, dates and time, flight number, cost, payment status, confirmation number, traveler name, email address, phone number, and other specific booking data; (b) traveler profile data including department, manager, location code, and other traveler profile data (UDID); and (c) trip specific profile data including customer number (UDID). Second, the traveler books a hotel or housing via Expedia or other web based travel provider creating booking specific housing data including name, email address, hotel name, hotel address, hotel rate, check-in time, checkout date, and other relevant hotel data.

It can as you can be seen that two important pieces of the itinerary data are missing. The applications and methods of this disclosure solves this by fixing the gaps in these types of bookings into a single format. Once data augmentation occurs, the entire trip record has the air booking and the hotel booking as part of single business trip.

The applications and methods of this disclosure offer all the above trip related services, but importantly, the applications and methods of this disclosure capture travel itinerary data made via different channels (websites, TMC, etc.) and augments the travel itinerary data to create business trip aggregated itinerary data providing employee travelers a single or one "view" of the data concerning a trip from a trip management perspective. Thus, the applications and methods of this disclosure provides methods for capturing, organizing and displaying aggregated employee travel itinerary from a mobile or non-mobile device using a single application implemented on the device. The applications and methods of this disclosure also offers employee travelers, during a trip, the ability to contact an agent (a robot or an agent) to request help, make modifications to the itinerary, review the aggregated itinerary data to insure completeness and accuracy and/or view the aggregated itinerary on a mobile or non-mobile device.

Suitable Devices for Use in the Invention

Suitable smart devices include, without limitation, smart phones, tablets, notebooks, desktops, or mobile smart devices. Exemplary smart phone, table, notebook, or other similar device manufacturers include, without limitation, ACER, ALCATEL, ALLVIEW, AMAZON, AMOI, APPLE, ARCHOS, ASUS, AT&T, BENEFON, BENQ, BENQ-SIEMENS, BIRD, BLACKBERRY, BLU, BOSCH, BQ, CASIO, CAT, CELKON, CHEA, COOLPAD, DELL, EMPORIA, ENERGIZER, ERICSSON, ETEN, FUJITSU SIEMENS, GARMIN-ASUS, GIGABYTE, GIONEE, GOOGLE, HAIER, HP, HTC, HUAWEI, I-MATE, I-MOBILE, ICEMOBILE, INNOSTREAM, INQ, INTEX, JOLLA, KARBONN, KYOCERA, LAVA, LEECO, LENOVO, LG, MAXON, MAXWEST, MEIZU, MICROMAX, MICROSOFT, MITAC, MITSUBISHI, MODU, MOTOROLA, MWG, NEC, NEONODE, NIU, NOKIA, NVIDIA, O2, ONEPLUS, OPPO, ORANGE, PALM, PANASONIC, PANTECH, PARLA, PHILIPS, PLUM, POSH, PRESTIGIO, QMOBILE, QTEK, QUALCOM, SAGEM, SAMSUNG, SENDO, SEWON, SHARP, SIEMENS, SONIM, SONY, SONY ERICSSON, SPICE, T-MOBILE, TEL.ME., TELIT, THURAYA, TOSHIBA, UNNECTO, VERTU, VERYKOOL, VIVO, VK MOBILE, VODAFONE, WIKO, WND, XCUTE, XIAOMI, XOLO, YEZZ, YOTA, YU, and ZTE. It should be recognized that all of these mobile smart devices including a processing unit (often times more than one), memory, communication hardware and software, a rechargeable power supply, and at least one human cognizable output device, where the output device may to be audio, visual and/or audio visual.

Suitable computer and server manufacturers include, without limitation, @Xi Computer Corporation, @Xi Computer, ABS Computer Technologies (Parent: Newegg), Acer, Gateway, Packard Bell, ADEK Industrial Computers, Advent, Amiga, Inc., A-EON Technology, ACube Systems Srl, Hyperion Entertainment, Agilent, Aigo, AMD, Aleutia, Alienware (Parent: Dell), AMAX Information Technologies, Ankermann, AORUS, AOpen, Apple, Arnouse Digital Devices Corp (ADDC), ASRock, Asus, AVADirect, AXIOO International, BenQ, Biostar, BOXX Technologies, Inc., Chassis Plans, Chillblast, Chip PC, Clevo, Sager Notebook Computers, Cray, Crystal Group, Cybernet Computer Inc., Compal, Cooler Master, CyberPower PC, Cybertron PC, Dell, Wyse Technology, DFI, Digital Storm, Doel (computer), Elitegroup Computer Systems (ECS), Evans & Sutherland, Everex, EVGA, Falcon Northwest, FIC, Fujitsu, Fusion Red, Foxconn, Founder Technology, Getac, Gigabyte, Gradiente, Groupe Bull, Grundig (Parent: Arcelik), Hasee, Hewlett-Packard (HP), Compaq, Hitachi, HTC, Hyundai, IBM, IBuyPower, Intel, Inventec, In-Win, Ironside, Itautec, IGEL, Jetta International, Kohjinsha, Kontron AG, LanFirePC, Lanix, Lanner Electronics, LanSlide Gaming PCs, Lenovo, Medion, LG, LiteOn, Maingear, MDG Computers, Meebox, Mesh Computers, Micron, Microsoft, Micro-Star International (MSI), Micro Center, MiTAC, Motion Computing, Motorola, NComputing, NCR, NEC, NUDT, NVIDIA, NZXT, Olidata, Olivetti, Oracle, Origin PC, Panasonic, Positivo Informatica, Psychsoftpc, Puget Systems, Quanta Computer, RCA, Razer, RoseWill, Samsung, Sapphire Technology, Sharp Corporation, Shuttle, SGI, Siragon, Sony, StealthMachines, Supermicro, Systemax, System76, T-Platforms, TabletKiosk, Tadpole Computer, Tatung, Toshiba, Tyan, Unisys, V3 Gaming PC, Velocity Micro, Overdrive PC, Vestel, Venom, VIA Technologies, ViewSonic, Viglen, Virus Computers Inc., Vizio, VT Miltope, Wistron, Wortmann, Xidax, Zelybron, Zombie PC, and Zoostorm, and Zotac. It should be recognized that all of these computer and services including at least one processing unit (often times many processing units), memory, storage devices, communication hardware and software, a power supply, and at least one human cognizable output device, where the output device may to be audio, visual and/or audio visual.

Suitable employer or company travel rules include, without limitation, corporate travel discount codes, preferred commercial air transportation service providers, preferred private air transportation service providers, preferred commercial ground transportation service providers, preferred private ground transportation service providers, preferred commercial sea transportation service providers, preferred private sea transportation service providers, preferred commercial housing service providers, preferred private housing service providers, acceptable employee billing and/or account codes, travel coordination rules such as group meeting travel, coordinated employee travel rules, any other employer travel rule, or combinations thereof.

Suitable employee travel rules include, without limitation, preferred room outlay, preferred room floor locations, preferred hotel/motel locations, preferred air plane seat assignments, preferred ground transportation vehicles, preferred restaurant selections, preferred time of day air travel selections, any other employee travel rules, or combinations thereof.

DETAILED DESCRIPTION OF THE DRAWINGS

Referring now to FIG. 1, an embodiment of a system for implements an aggregating travel application one or a plurality of smart mobile and/or non-devices, generally 100, is shown to include a host site 102 comprising at least one server. The system 100 also include one or a plurality of employer sites 104, a plurality of housing service sites 106, a plurality of ground transportation sites 108 and a plurality of air transportation sites 110a and a plurality of new distribution capability sites 110b. The system 100 also include a plurality of mobile devices 112 and a plurality of non-mobile devices 114. It should be recognized that the systems may be implements mobile devices, non-mobile devices, and/or servers depending on the user and the situation. Generally, business travelers will access the applications via their mobile devices, but in other situations, the business travelers may access the application via non-mobile devices. Generally, travel agents associated with host site, will often access the applications via non-mobile devices, but they too may access the applications from mobile devices. Generally, employers will access the applications from servers, non-mobile, or mobile devices. Thus, the applications, systems and methods of this disclosure may be implemented on any device that is capable of running the applications and communicating with the host site and the various other sites from which travel itinerary data is collected for aggregation, updating, modification and/or alteration by the employee (traveler), agent, and/or employers.

The system 100 also includes communication pathways or links 116 between the host site 102 and the employer sites 104, the housing services site 106, the ground transportation sites 108, the air transportation sites 110, the mobile devices 112, and the non-mobile devices 114. The system 100 also includes communication pathways or links 118 between the housing sites and the mobile devices 112 and the non-mobile devices 114. The system 100 also includes communication pathways or links 120 between the ground transportation sites and the mobile devices 112 and the non-mobile devices 114. The system 100 also includes communication pathways or links 122a and 122b between the air transportation sites 110a and new distribution capability sites 110b the and the mobile devices 112 and the non-mobile devices 114. The system 100 also includes communication pathways or links 124 between one of the employer sites 104 and the mobile devices 112 and the non-mobile devices 114. All of the communication pathways or links 116-124 are wireless and/or wired communication pathways or links that support bi-directional data exchange between the sites 102-110 and the mobile devices 112 and the non-mobile devices 114. Wireless communication pathways or links include cellular communication pathways or links, satellite communication pathways or links, and/or any other type of wireless communication pathways or links supporting bi-directional communications between the sites 102-110 and the mobile devices 112 and the non-mobile devices 114. Wired communication pathways or links include cable, twisted pair, fiber optics or any other wired communication pathways supporting bi-directional communications between the sites 102-110 and the mobile devices 112 and the non-mobile devices 114. The application is installed on the host site 104 and the mobile devices 112 and the non-mobile devices 114. Once installed, the application requests information concerning assess and type. In the case of an employer site 104, the application requests a list of employees authorized to install and use the application on a mobile device 112 and/or a non-mobile device 114. In the case of an employee, the application request the employer to register, which involved determining if the employee is on the authorized list of employees entered into the host site 102 by the employer or employer representative. Once registration is confirmed, the application requests the employee to establish an account requiring a user name and password for future activation and use of the application. Other aspects of the application will be described below in relationship to embodiments of the methods performed by the application both at the host site 102, the mobile devices 112, the non-mobile devices, or combinations thereof.

Figure 2:
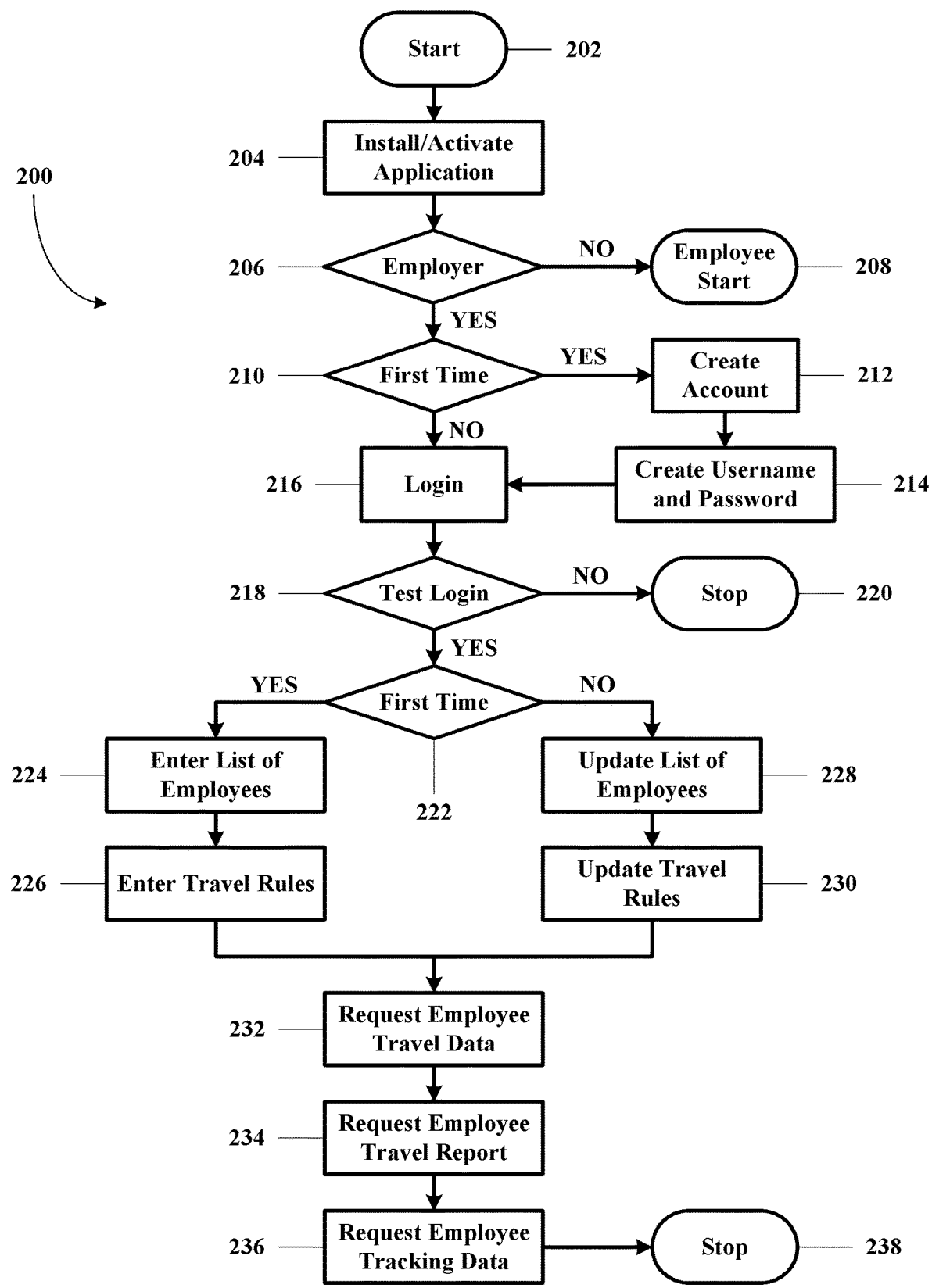
FIG. 2 depicts an embodiment of a method implementing a smart mobile device application.

Referring now to FIG. 2, an embodiment of a method for implementing a travel application on an employer site or an employee smart mobile or non-mobile device, generally 200, including a start step 202, which generally means that the user has activated the device and proceed either to an application selection feature or has used a web search engine to go to the host site to down load the application. The methods then installs and activates or activates the application, if already installed, on the device in an install/activate step 204. Once installed and activated or activated, the application asks if the user is an employee or employer (or authorized employer representative) in a employer test step 206. If the user is an employee, then control is transferred along a NO path to a go to employee step 208.

Embodiment of a Method for Employer Application Interaction

If the user is an employer or authorized representative thereof, then control is transferred along a YES path to test to determine if this is the first time the employer has accessed the application in a first time test step 210. If this is the first time, then control is transferred along a YES path to a create an account step 212 and then on to a create username/password step 214. These two steps 212 and 214 provide the necessary security for using the application.

After account creation and creation of username/password, control is transferred to a login step 216. If this is not the first time, then control is transferred along a NO path directly to the login step 216. The login step 216 requests user name and password and control is transferred to a test login step 218, where user name and password is tested to determine if the user is authorized, the test may also include mobile device information, finger print data, retinal data, etc. If verification fails, then control is transferred along a NO path to a stop step 220. Alternatively, the method may send control back to the login step 216 for a predetermined number of times before transferring control the stop step 220. The stop step 220 may lock the application for a period of time or simply make the user return to the start step. Control is then transferred to another first time test step 222.

If this is the first time into the application, then control is transferred along a YES path to a series of data entry steps, here only two step are shown, but the steps may include billing and accounting data, employer preference data, employee preference data, or other relevant data to be stored on the host site to facility travel data aggregation and travel data analytics. In the case, the method request the entry of a list of employees in an enter list of employee step 224. The step 224 may include not only the employee name, but may so include billing and accounting data, location and management data, personal data (e.g., email addresses, phone number, etc.), or the entry of any other employee relevant information. The method also includes a travel rule entry step 226. In this step, the employer enters in rules associated with travel such as authorized and/or preferred air transportation providers, authorized and/or preferred ground transportation providers, authorized and/or preferred housing providers, other authorized and/or preferred travel services providers, provider corporate discount codes, or other employer travel rules. The step 226 may also permit the employer to enter employee specific information such as provider reward numbers, upgrade preferences, seating preferences, housing room preferences, or any other employee specific preference.

If this is not the first time, then control is transferred along a NO path to update data entry steps, shown here as two update date steps including an update employee list step 228 and an update travel rules step 230. Again, these two steps 228 and 230 may permit the employer to update and/or add all relevant data. As this data is entered at the host site, some of these rules such as the employee specific rules may be modified by usage as the application accumulates travel data or may be modified by the employee. These rules are then updated at the host site and the employer site so that each site has fully complete and consistent rules. After either data entry or data updating, control is transferred to one or more request steps available to the employer. Here the request steps include a request for employee travel data step 232, where the employer may request employee specific travel itinerary data of some or all employee travel itinerary data for a given period of time or since the last request. The requests steps may also include a request employee travel report step 234, where the method/application generates an employer travel report including data from which data analytics may be performed either at the host site, the employee device, and/or the employer site. The requests steps may also include a request employee tracking report step 236, where the employer may request employee specific tracking data of some or all employee travel tracking data for a given period of time or since the last request. This data may provide the employer, employee or host site representative the opportunity to notify employees of potential disruptions in travel plans, threat level changes, or any other situation that may adversely affect employee travel. After the request steps, the method transfers control to a stop step 238.

Embodiment of a Method for Employee Application Interaction

If the user is an employee, then control is transferred from the employee start step 208 to test to determine if this is the first time the employee has accessed the application in a first time test step 240. If this is the first time, then control is transferred along a YES path to an authorized test step 242, where the employee is checked against the employer authorized employee list. If the employee is not on the authorized list, then control is transferred along a NO path to contact employer step 243 and then to a stop step 244. The contact employer step 234 will cause the application to either notify the host site that a user has request to be added to the employee list and the request is then forwarded to the employer or the request is sent direct to the employer. Either way, an employer representative may then login into the application at the employer site as the employer and add the employee to the employee list. Once added, the application will notified the employee, and the employee may activate the application again passing the authorized test 242.

If the employee is authorized, then control is transferred along a YES path to a create username/password step 246. These two steps 242 and 246 provide the necessary security for using the application. After authorizing and creation of username/password, control is transferred to a login step 248. If this is not the first time, then control is transferred along a NO path directly to the login step 248. The login step 248 requests user name and password and control is transferred to a test login step 250, where user name and password is tested to determine if the user is authorized, the test may also include mobile device information, finger print data, retinal data, etc. If verification fails, then control is transferred along a NO path to a stop step 252. Alternatively, the method may send control back to the login step 250 for a predetermined number of times before transferring control the stop step 252. The stop step 252 may lock the application for a period of time or simply make the user return to the start step 208. Control is then transferred to another first time test step 254. If this is the first time into the application, then control is transferred along a YES path to a series of data entry steps, here only two step are shown, but the steps may include billing and accounting data, employer preference data, employee preference data, or other relevant data to be stored on the host site to facility travel data aggregation and travel data analytics. In the case, the method requests the entry of employee specific data in an enter employee data step 256. The step 256 may include not only the employee name, but may so include employee specific data such as reward data, etc. The method also includes a employee travel rule entry step 258. In this step, the employee enters in rules associated with employee specific data such as provider reward numbers, upgrade preferences, seating preferences, housing room preferences, or any other employee specific preference. If this is not the first time, then control is transferred along a NO path to update data entry steps, shown here as two update date steps including an update employee specific data step 260 and an update employee travel rules step 262. Again, these two step 260 and 262 may permit the employee to update and/or add all relevant data accessible to the employee employer specific data is inaccessible to employees. As this data is entered at the host site, some of these rules such as the employee specific rules may be modified by usage as the application accumulates travel data or may be modified by the employee. These rules are then updated at the host site and the employer site so that each site has fully complete and consistent rules. After either data entry or data updating, control is transferred to one or more request steps available to the employer. Here the request steps include a request for employee travel itinerary data step 264, where the employee requests a specific or current travel itinerary. The requests steps may also include a request employee travel report step 266, where the method/application generates an employee travel report showing costs, billing and accounting data. The requests steps may also include an optional request employee tracking report step 268, where the employee may view other employee locations, whether traveling or not. This data may provide the employer, employee or host site representative the opportunity to notify employees of potential disruptions in travel plans, threat level changes, or any other situation that may adversely effect employee travel. After the request steps, the method transfers control to a stop step 270.

Figure 3:
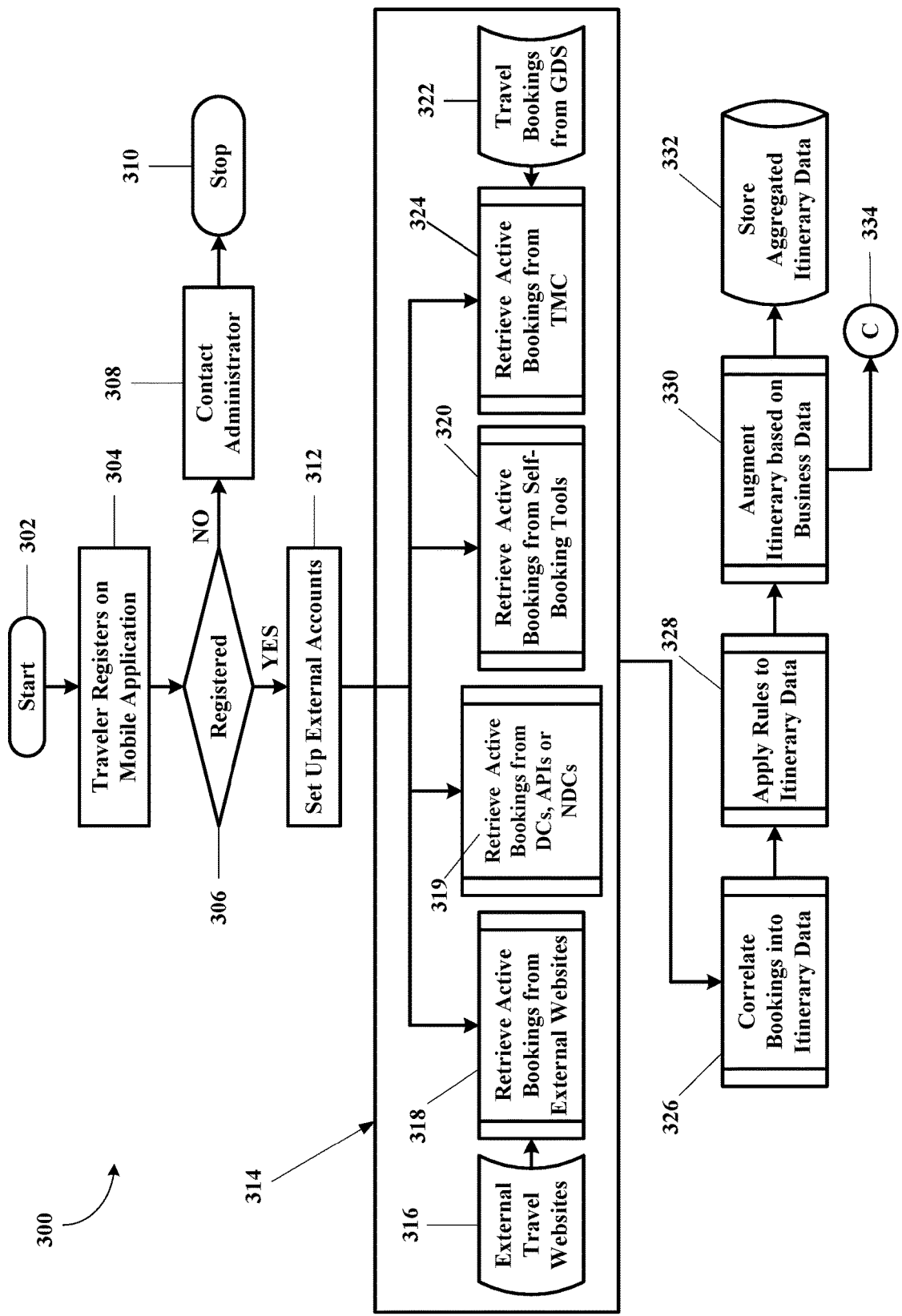
FIG. 3 depicts another embodiment of a method implementing a smart mobile device application.
Figure 3:
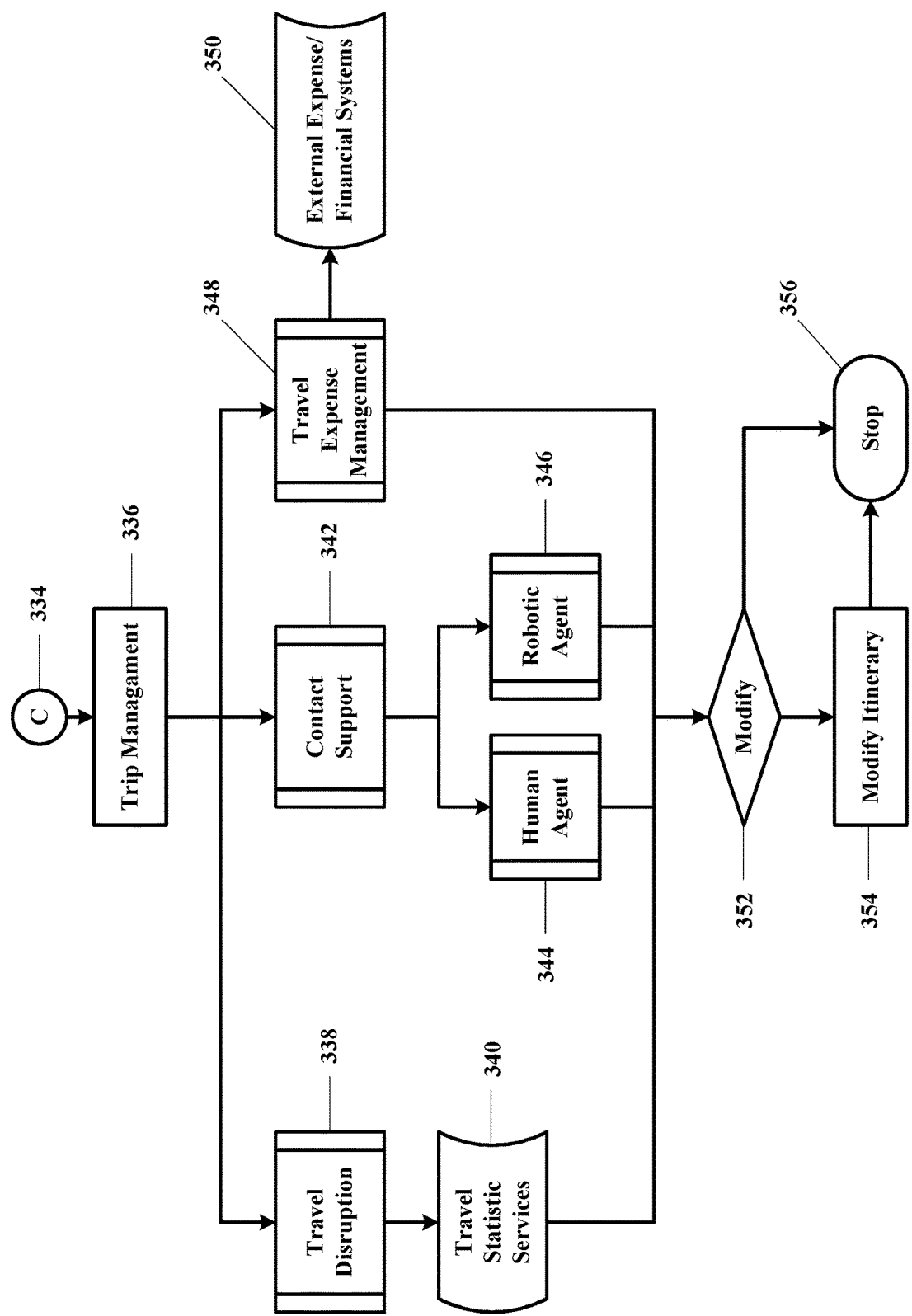

Referring now to FIG. 3, an embodiment of a method for implementing a mobile travel application on a smart mobile or non-mobile device, generally 300, including a start step 302. The start step 302 activates the application previously installed on the device. Once activated, the method requests a traveler to register or login to the application in a registration step 304. The registration step 304 comprises a standard user name and password interchange. Once the user name and password information has been entered, the method checks to determine if the user is registered in a test step 306. If the traveler is not registered, then the method transfers control along a NO path to a contact corporate manager step 308 and then to a stop step 310. Once the manager registers the traveler, the traveler can reactivate the application by activating the application on the mobile device and going back through the registration step 304 and the test step 306. If the traveler is registered, then the method transfers control along a YES path to a set up step 312, where the user enters travel information data including travel data, purpose data, billing data, and/or any other data. The travel data generally include destination data, air carrier data, land carrier data, and/or housing data. The set up step 312 includes a set of steps set forth in the set up block 314. The block 314 includes a first retrieve active booking from external websites 316 in a first retrieve step 318. The block 314 also includes a second retrieve active booking from external websites 316 via direct connections (DCs), advance passenger information systems (APIs), or New Distribution Capability tools (NDCs) in a second retrieve step 319, where DCs are direct connections to airline specific sites for direct booking, APIs book through a passenger information system, and NDCs are travel industry-supported programs (NDC Program) launched by International Air Transport Association (IATA) for the development and market adoption of a new, XML-based data transmission standard (NDC Standard). The block 314 also includes a third retrieve active booking from self-booking tools in a third retrieve step 320. The block 314 also includes a fourth retrieve active bookings from a travel management company (TMC) via a GDS 322 in a fourth retrieve step 324. Of course, it should be recognized that the block 314 may include other retrieve booking information steps associated with other formats or other sites that may include relevant business itinerary data to be aggregated and made available of the employee, travel agent, and/or employer. Once the set up information has been entered by the traveler into the application on the mobile device, control is transferred to a correlate step 326, where the booking data is aggregated into business trip itinerary data viewable by the user on the mobile device. Once the itinerary has been populated on the mobile device, the application applies rules to the itinerary data in a apply rules step 328. Once the rules are applied to the itinerary, the method augments the itinerary populating the mobile application with the augments itinerary data in an augment step 330. The augments itinerary data is then upload and stored as aggregated trip data in a store step 332. The method then transfers control to a continuation step 334, which is just a place holder for the continuation of the FIG. 3 and transfers control to a trip management step 336. The trip management step 336 handles travel disruptions and trip modifications, support functions, travel expense management. The trip management 336 includes a travel disruption step 338, which uses travel statistic services in a step 340. The trip management 336 includes a contact support step 342, which may be a human agent in a step 344 or a robotic agent 346. The trip management 336 includes a travel expense management step 348, which includes a transfer information step 350 to an external expense/financial system generally associated with the employer site, but may be associate with both the host site and the employer site. The method also includes a modify itinerary step 352 flowing from any of the trip management steps 340, 344, 346, or 348. If modification are made to the itinerary, then control is transferred along a YES path to a modified itinerary step 354, which modifies the itinerary and updates the information at the host site, the employer site and the employee device or devices. Control is then forwarded to a stop step 356. If modification is not made, then control is transferred along a NO path to the stop step 356.

Figure 4:
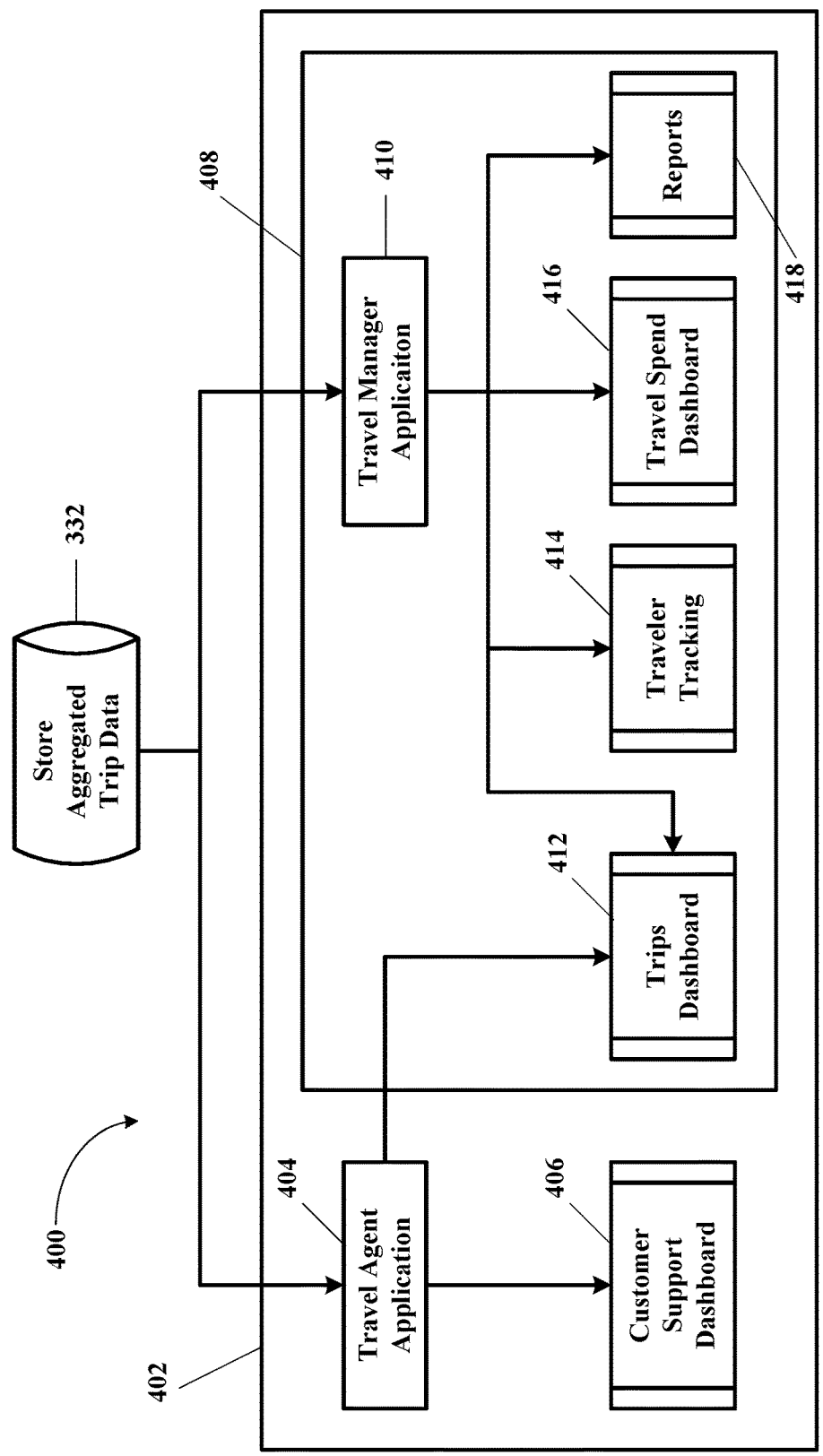
FIG. 4 depicts an embodiment of a method implementing aspects of the smart mobile device application.

Referring now to FIG. 4, an embodiment of a method for implementing the store aggregated trip data step 332, generally 400, is shown to include an aggregation box 402. The method transfers control from the store aggregated trip data 332 to a travel agent application step 404 and then to a customer support dashboard function step 406. The box 402 also includes an inner box 408, which relates to steps relating to travel management. The method transfers control from the store aggregated trip data 332 to a travel manager application step 410. The method also includes a trips dashboard function step 412, which is accessible both from the travel agent application step 404 and the travel manager application step 410. The travel manager application step 410 is also connected to a traveler tracking function step 414, a travel spend dashboard function step 416, and a reports generation function step 418. These function steps are design to store and update employee travel itinerary making the data accessible by the employee and employer for all features captured and available through the methods and applications.

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:
1. A method comprising:
enrolling an employer including:
installing an employee travel application from a host site comprising at least one host server onto an employer site comprising at least one employer server or at least one employer computer,
establishing an employer user name and an employer password for accessing the application,
accessing the application using the employer user name and password,
entering a list of employees into the application that are authorized to travel for the employer,
entering a list of employer travel rules into the application, and
entering billing and accounting data into the application,
enrolling each authorized employee including:
testing each employee to determine if the employee is on the employee list,
if the employee is on the list, then installing the employee travel application from the host site or the employer site onto each employee mobile,
establishing, for each employee, an employee user name and an employee password for accessing the application on the employee devices,
invoking the application on an authorized employee mobile or non-mobile device,
querying the authorized employees about self-bookings, collecting self-booking employee travel data from the self-bookings, forwarding the self-booking employee travel data to the host site and the employer site, retrieving housing and travel employee travel data from one or more housing sites, one or more air travel sites, one or more ground/sea transportation sites, and/or other travel related sites, merging or aggregating the retrieved housing and travel employee travel data, employee data from the employer site, and employee data from host site to form employee travel itinerary data for the authorized employees and storing the employee travel itinerary data on the employee device and in databases on the host site and the employer site, transferring the employee travel itinerary data from the host site or employer site onto the authorized employee devices and onto other authorized employee devices of other authorized employees requesting the authorized employee itinerary data, applying the employer travel rules to the employee travel itinerary data, updating bookings directly at specific housing service sites, ground/sea travel sites, and/or air travel sites based on the applied employer travel rules, or notifying the employee to update the bookings at the specific housing service sites, ground/sea travel sites, and/or air travel sites, for any employee requiring updated bookings, updating employee travel itinerary data on the employee devices, the host site, and the employer site, displaying the employee travel itinerary data on the authorized employee devices and on other authorized employees devices of other authorized employees requesting the employee travel itinerary data, monitoring trip advisors, delays/cancellations, and/or other potential trip augmenting data, if the monitored information requires one change or a plurality of changes to the authorized employee travel itinerary data, searching the housing sites, the air travel sites, the ground/sea transportation sites, and/or other travel related sites for alternate choices, notifying the authorized employee of the alternate choices, modifying the authorized employee travel itinerary data based either on employee input, employer input, or automatic input based on the employer travel rules, updating the employee travel itinerary data on the authorized employee devices, the host site, and the employer site, if billing and accounting data has not been associated with any aspect of the authorized employee travel itinerary data, then querying the employee to enter the billing and accounting data, querying the employer to enter the billing and accounting data, or generating the billing and accounting data based on the employer travel rules, updating the authorized employee travel itinerary data on the authorized employee devices, the host site, and the employer site, and displaying the updated employee travel itinerary data on the authorized employee devices or on other authorized employee devices of other authorized employees requesting the updated employee travel itinerary data.

2. The method of claim 1, further comprising:

searching the authorized employee email and text messages for travel related data including air travel bookings, housing bookings, land transportation bookings, and/or any other travel related bookings and correlating the responses to data collected in the querying steps, and merging non-duplicate correlated responses with the employee travel itinerary data for the authorized employees.

3. The method of claim 1, further comprising:

after applying the employer travel rules to the employee travel itinerary data, updating the employee travel itinerary data on the employee devices, the host site, and the employer site.

4. The method of claim 1, further comprising:

tracking the authorized employee mobile devices via one or more global positioning system (GPS) applications running on the authorized employee mobile device and updating the employee travel itinerary data on the all of authorized employee devices, the host site, and the employer site with GPS data and other relevant tracking data.

5. The method of claim 1, further comprising:

notifying the authorized employee, the employer, or a travel agent of potential difficulties and/or travel warnings.

6. The method of claim 1, further comprising:

generating billing and accounting reports, and sending the reports to the authorized employee and/or the employer for accounting and reimbursement.

7. The method of claim 1, further comprising:

analyzing the employee travel itinerary data for each the authorized employee, and modifying the employer travel rules.

8. The method of claim 1, further comprising:

analyzing the employee travel itinerary data for each authorized employee, and modifying the employer travel rules, and modifying the employee travel rules.

9. A mobile device having implemented thereon an application for performing the steps of the method of claim 1.

10. A non-mobile device having implemented thereon an application for performing the steps of the method of claim 1.

11. A server having implemented thereon an application for performing the steps of the method of claim 1.

12. A system comprising:

one or more employee mobile and/or non-mobile devices, a host site comprising one or more host servers, one or more employer sites comprising one or more employer servers, a plurality of housing service sites, a plurality of ground or sea transportation service sites, a plurality of air transportation service sites, and communication pathways interconnecting the devices and the sites, wherein the system is configure to:

enroll an employer including:

install an employee travel application from the host site onto the employer site, establish an employer user name and an employer password for accessing the application, access the application using the employer user name and password, enter a list of employees into the application that are authorized to travel for the employer, enter a list of employer travel rules into the application, and enter billing and accounting data into the application, enroll each authorized employee including:

test each employee to determine if the employee is on the employee list, if the employee is on the list, then install the employee travel application from the host site or the employer site onto each employee mobile, establish, for each employee, an employee user name and an employee password for accessing the application on the employee devices, invoke the application on an authorized employee mobile or non-mobile device, query the authorized employees about self-bookings, collect self-booking employee travel data from the self-bookings, forward the self-booking employee travel data to the host site and the employer site, retrieve housing and travel employee travel data from the one or more housing service sites, one or more air transportation service sites, one or more ground or sea transportation service sites, and/or other travel related sites, merge or aggregate the retrieved housing and travel employee travel data, employee data from the employer site, and employee data from host site to form employee travel itinerary data for the authorized employees and storing the employee travel itinerary data on the employee device and in databases on the host site and the employer site, transfer the employee travel itinerary data from the host site or employer site onto the authorized employee devices, apply the employer travel rules to the employee travel itinerary data, update bookings directly at specific housing service sites, ground/sea travel sites, and/or air travel sites based on the applied employer travel rules, or notifying the employee to update the bookings at the specific housing service sites, ground/sea travel sites, and/or air travel sites, for any employee requiring updated bookings, update employee travel itinerary data on the employee devices, the host site, and the employer site, display the employee travel itinerary data on the authorized employee devices and on other authorized employees devices of other authorized employees requesting the employee travel itinerary data, monitor trip advisors, delays/cancellations, and/or other potential trip augmenting data, if the monitored information requires one change or a plurality of changes to the authorized employee travel itinerary data, search the housing sites, the air travel sites, the ground/sea transportation sites, and/or other travel related sites for alternate choices, notify the authorized employee of the alternate choices, modify the authorized employee travel itinerary data based either on employee input, employer input, or automatic input based on the employer travel rules, update the employee travel itinerary data on the authorized employee devices, the host site, and the employer site, if billing and accounting data has not been associated with any aspect of the authorized employee travel itinerary data, then query the employee to enter the billing and accounting data, querying the employer to enter the billing and accounting data, or generating the billing and accounting data based on the employer travel rules, update the authorized employee travel itinerary data on the authorized employee devices, the host site, and the employer site, and display the updated employee travel itinerary data on the authorized employee devices.

13. The system of claim 12, wherein the system is further configure to:

search the authorized employee email and text messages for travel related data including air travel bookings, housing bookings, land transportation bookings, and/or any other travel related bookings and correlating the responses to data collected in the querying steps, and merge non-duplicate correlated responses with the employee travel itinerary data for the authorized employees.

14. The system of claim 12, wherein the system is further configure to:

after applying the employer travel rules to the employee travel itinerary data, update the employee travel itinerary data on the employee devices, the host site, and the employer site.

15. The system of claim 12, wherein the system is further configure to:

track the authorized employee mobile devices via one or more global positioning system (GPS) applications running on the authorized employee mobile device and update the employee travel itinerary data on the all of authorized employee devices, the host site, and the employer site with GPS data and other relevant tracking data.

16. The system of claim 12, wherein the system is further configure to:

notify the authorized employee, the employer, or a travel agent of potential difficulties and/or travel warnings.

17. The system of claim 12, wherein the system is further configure to:

generate billing and accounting reports, and send the reports to the authorized employee and/or the employer for accounting and reimbursement.

18. The system of claim 12, wherein the system is further configure to:

analyze the employee travel itinerary data for each authorized employee, and modify the employer travel rules.

19. The system of claim 12, wherein the system is further configure to:

analyze the employee travel itinerary data for each authorized employee, modify the employer travel rules, and modify the employee travel rules.

* * * * *